United States Patent
Kunori

(10) Patent No.: US 9,367,222 B2
(45) Date of Patent: Jun. 14, 2016

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Shiro Kunori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 336 days.

(21) Appl. No.: 14/037,539

(22) Filed: Sep. 26, 2013

(65) Prior Publication Data

US 2014/0108984 A1  Apr. 17, 2014

(30) Foreign Application Priority Data

Oct. 16, 2012 (JP) ................... 2012-229245

(51) Int. Cl.
*G06F 3/048* (2013.01)
*G06F 3/0484* (2013.01)
*G06F 3/0488* (2013.01)

(52) U.S. Cl.
CPC .......... *G06F 3/04847* (2013.01); *G06F 3/0488* (2013.01)

(58) Field of Classification Search
CPC .................................. G06F 3/04847
See application file for complete search history.

(56) References Cited

U.S. PATENT DOCUMENTS

2003/0222925 A1* 12/2003 Regelous ............ G06F 3/04847
                                                                715/856
2013/0076642 A1*  3/2013 Rampson .............. G06F 3/0488
                                                                345/173

FOREIGN PATENT DOCUMENTS

JP          8-249125 A      9/1996

* cited by examiner

*Primary Examiner* — Peiyong Weng
(74) *Attorney, Agent, or Firm* — Carter, DeLuca, Farrell & Schmidt, LLP

(57) ABSTRACT

An information processing apparatus that displays a numeric value input area having multiple digit positions and changes a numeric value of the input area in accordance with a user operation on the input area, as well as a control method and a storage medium. The information processing apparatus calculates, when a movement of the plurality of digit positions of the numeric value input area is instructed by the operation of the user, a movement direction and a movement amount, performs a moving, in accordance with the movement direction and the movement amount of each numeral of the plurality of digit positions of the input area, and inserts a predetermined numeral into a digit position whose numeral became undefined by the moving of the numeral of each digit position in the moving.

11 Claims, 10 Drawing Sheets

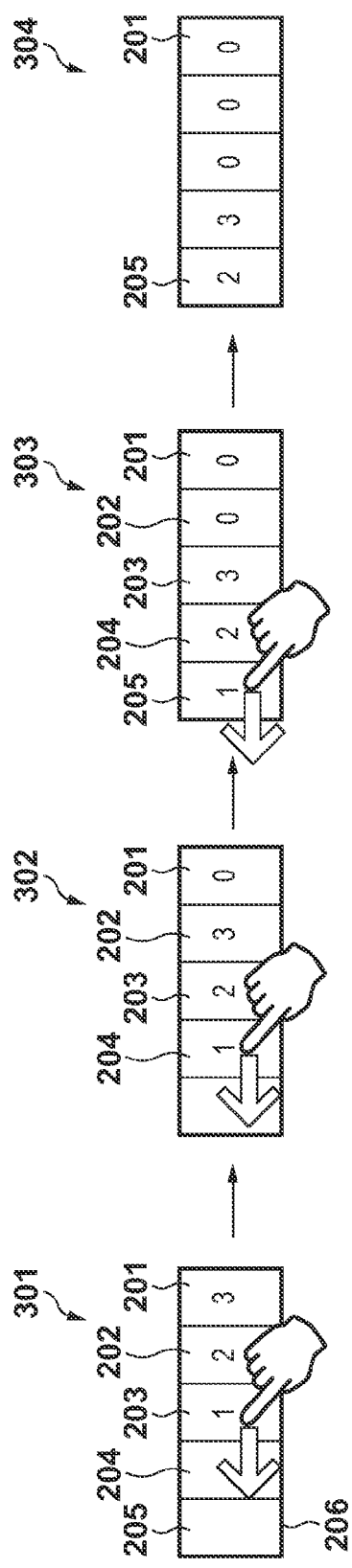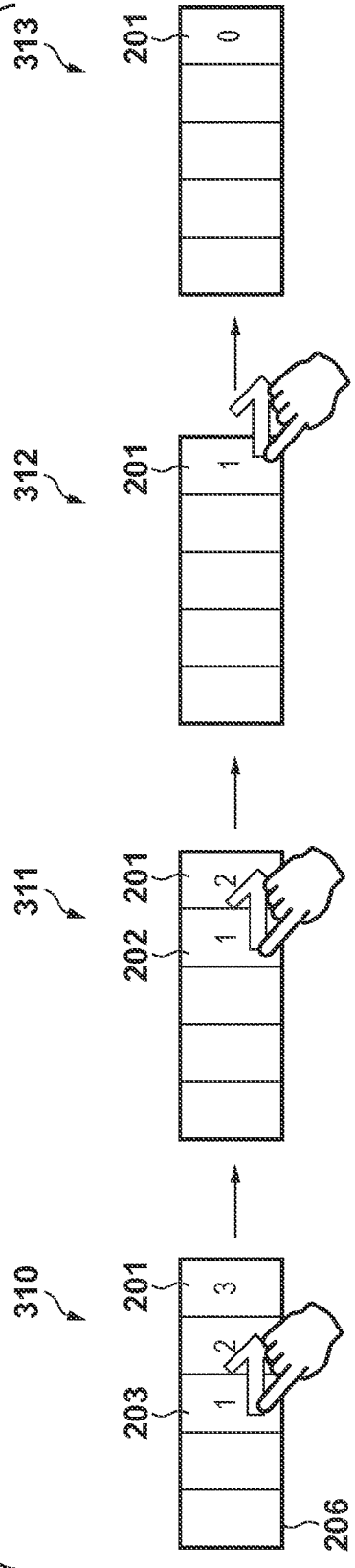

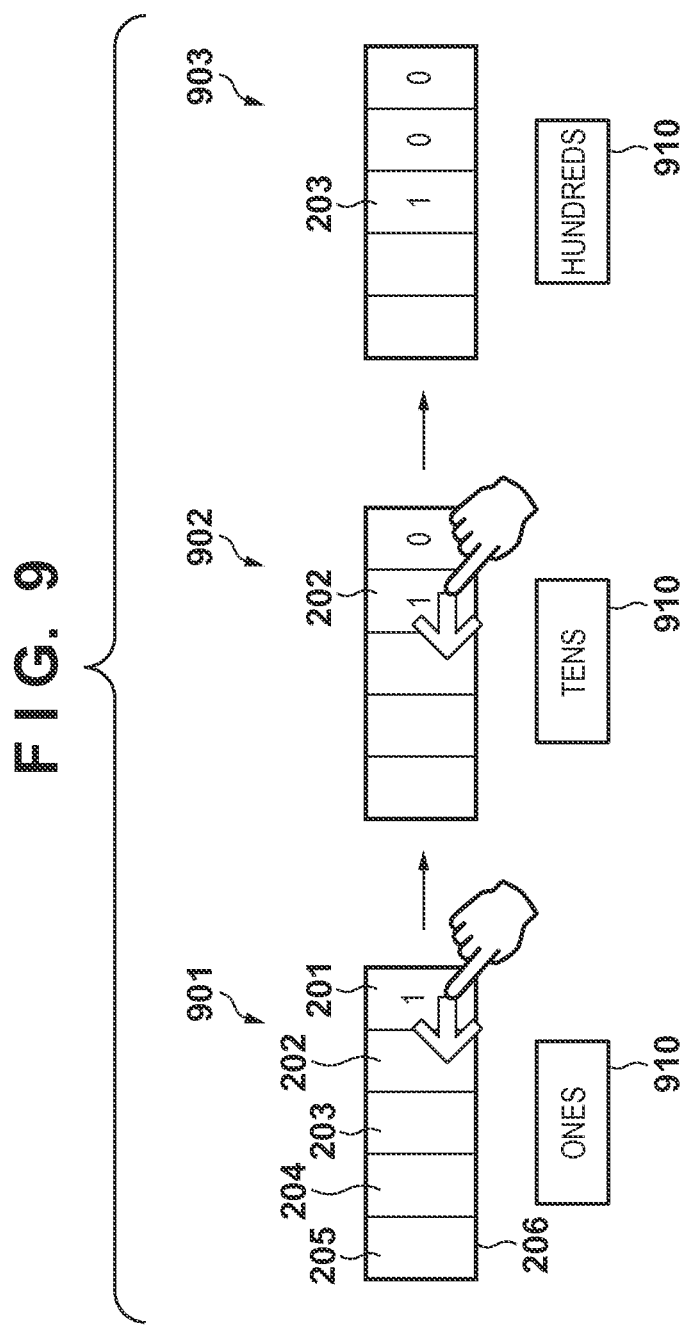

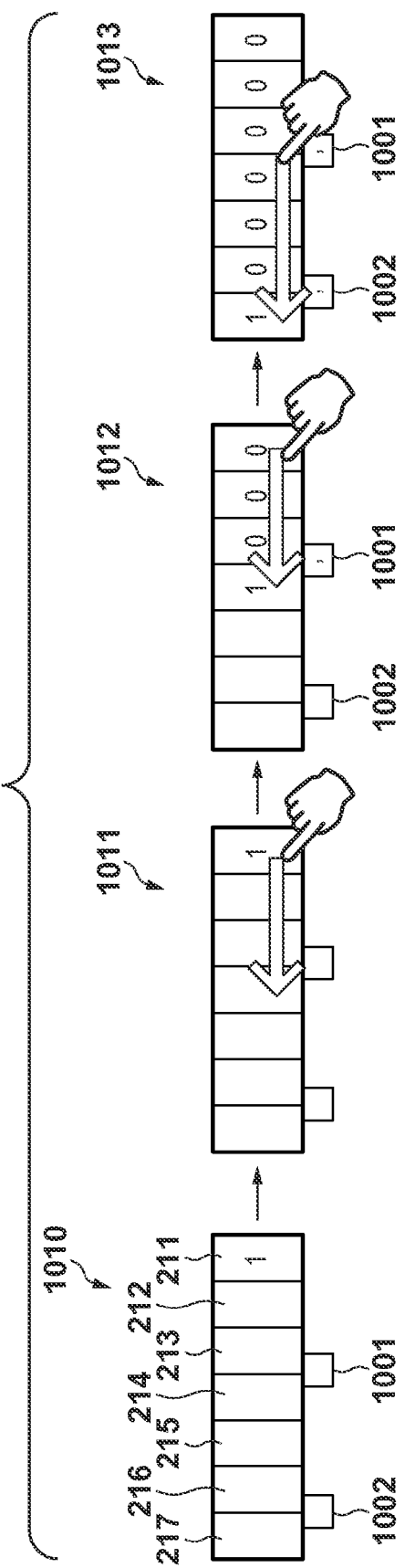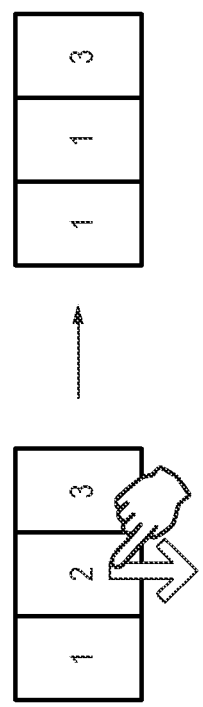

INFORMATION PROCESSING APPARATUS, METHOD OF CONTROLLING THE SAME, AND STORAGE MEDIUM

BACKGROUND OF THE INVENTION

1. Field of the Invention

The present invention relates to a technique for inputting numeric values on an information processing apparatus.

2. Description of the Related Art

In recent years, computer devices having touch panels have become widespread. On such computer devices, there are cases in which a user inputs numeric values using a touch panel. As methods of inputting numeric values, there is a method in which a soft keyboard screen is displayed on the touch panel and the user inputs by touching this keyboard, and there is also a method in which input is performed via an input apparatus such as a USB keyboard. Also, as another such method, a method is known in which a numeral having multiple digit positions is displayed on the touch panel, and the user inputs a desired numeric value by performing an operation for doing a move (also known as drag, flick or swipe) in an upward/downward orientation on the digit positions of this numeral (see FIG. 11). In FIG. 11, by dragging a numeral "2" in a center of a numeral "123" in a downward direction, it is changed to a "1" and the numeric value "113" is acquired. For this numeric value input method of using a drag operation in an upward/downward orientation, on top of the fact that it is not necessary to display a keyboard on the touch panel as in the soft keyboard method, there is also no need for an externally connected input apparatus such as a USB keyboard. Also, because the numeric value increases/decreases in accordance with the drag operation in an upward/downward orientation, the operation is intuitive for the user.

As yet another method, a method is known in which a position at which to input a numeral is specified with a pointer, and the numeric value to be input at the position increases/decreases with a movement direction of the pointer from that position (Japanese Patent Laid-Open No. 08-249125).

As described above, in a case where a numeric value is input by the method of increasing/decreasing the numeric value of the digit position by the drag operation in an upward/downward orientation or in the movement direction of a pointer, it can be thought that the user will more often input from the most significant digit position (highest order) of the numeral. However, in a case where a numeric value having many digit positions is input, with the above described conventional techniques, there is the problem that it is difficult to know into which displayed digit position to input the numeral of the most significant digit position of the numeric value to be input. Also, there is the problem that in a case where the most significant digit position of the numeric value to be input is off by 1 digit position, there is the necessity to change the numeral of each digit position, which is very cumbersome. For example, consider a case where when 10 digit position input boxes are displayed, and the numeric value "1234567890" is to be input into them, input is started mistakenly from the second box from the most significant box (in other words, from a hundred millions digit position). In this case, the user may not notice that there is no box into which to input the numeral "0" until he or she has already input the numeric value "123456789". In such a case, because all of the numerals of the digit positions (boxes) input until that point have to be changed, there is the problem that it is difficult for the user to use.

SUMMARY OF THE INVENTION

An aspect of the present invention is to eliminate the above-mentioned problems with the conventional techniques.

According to feature of the present invention, there is provided a technique for a user to easily input a numeric value at a numeric input area of a plurality of digit positions.

According to an aspect of the present invention, there is provided an information processing apparatus that displays a numeric value input area having a plurality of digit positions and that changes a numeric value of the numeric value input area in accordance with an operation of a user on the numeric value input area, the information processing apparatus comprising: a calculation unit configured to calculate, when a movement of at least one of the plurality of digit positions of the numeric value input area is instructed by the operation of the user, a movement direction of the movement and a movement amount of the movement; a movement unit configured to perform a moving in accordance with the movement direction and the movement amount calculated by the calculation unit of each numeral of the at least one of the plurality of digit positions of the numeric value input area; and an insertion unit configured to insert a predetermined numeral into a digit position whose numeral became undefined due to the moving by the movement unit.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3A and FIG. 3B are views for explaining concrete examples of a numeral movement of a positioned number setting area due to a move operation in a leftward/rightward orientation.

FIG. 9 is a view for explaining a concrete example of a numeral movement of the positioned number setting area due to a move operation in a leftward/rightward orientation according to the third embodiment.

FIG. 10 is a view for explaining a concrete example of a numeral movement of the positioned number setting area due to a move operation in a leftward/rightward orientation as a variation of the third embodiment.

FIG. 11 is a view for explaining prior art.

DESCRIPTION OF THE EMBODIMENTS

Embodiments of the present invention will be described hereinafter in detail, with reference to the accompanying drawings. It is to be understood that the following embodiments are not intended to limit the scope of the claims of the present invention, and that not all of the combinations of the aspects that are described according to the following embodiments are necessarily required with respect to the means to solve the problems according to the present invention.

Figure 1:
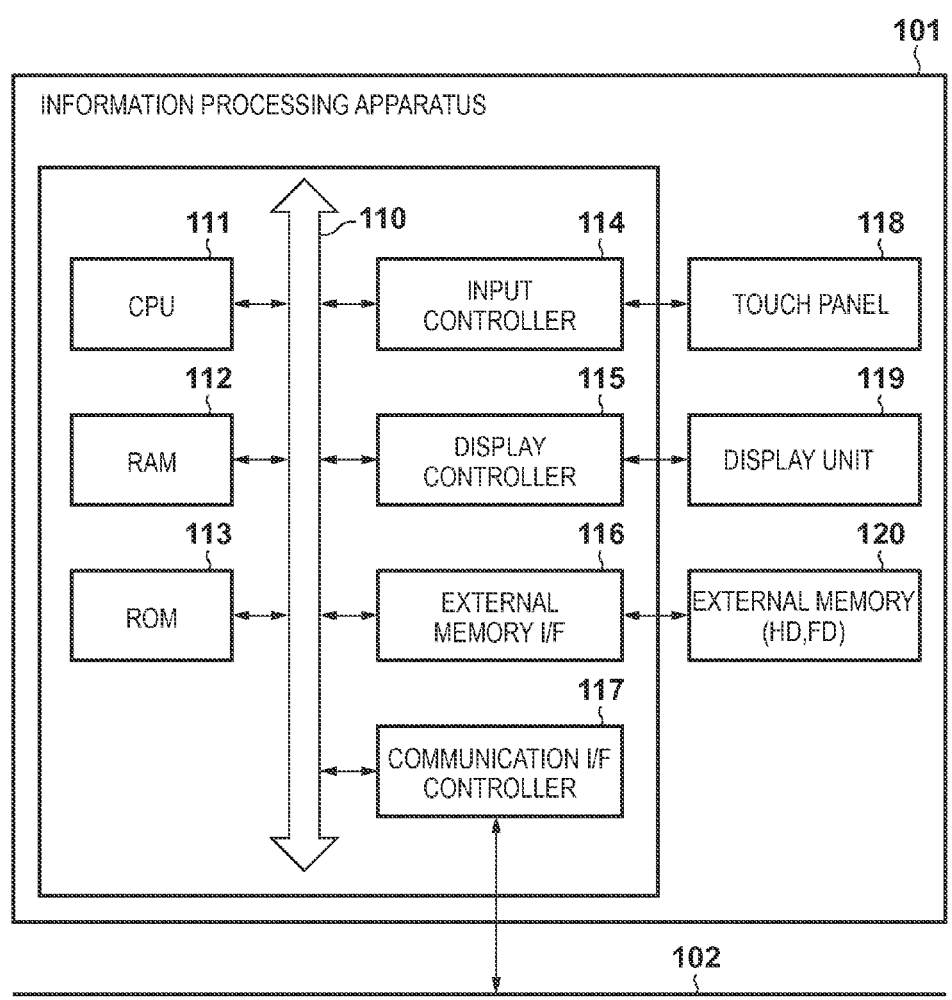
FIG. 1 is a block diagram for illustrating a hardware configuration of an information processing apparatus according to embodiments of the present invention.

FIG. 1 is a block diagram for illustrating a hardware configuration of an information processing apparatus 101 according to embodiments of the present invention.

A CPU 111, a RAM 112, a ROM 113, an input controller 114, a display controller 115, an external memory I/F 116 and a communication I/F controller 117 are connected to a system bus 110. Also, a touch panel 118, a display unit 119 and an external memory 120 are connected via the input controller 114, the display controller 115 and the external memory I/F 116 respectively. The system bus 110 includes an address bus, a data bus and control signal bus and each unit connected to the system bus 110 is configured to be able to perform data exchange with each other via the system bus 110.

The ROM 113 is a non-volatile memory and stores, in predetermined regions, image data, other data, various programs for the CPU 111 to operate and the like. The RAM 112 is a volatile memory and is used as a main memory of the CPU 111 and as a temporary storage area such as a work area. The CPU 111 controls operation of the information processing apparatus 101 on the whole, using the RAM 112 as a work memory, in accordance with programs loaded into the RAM 112 from the ROM 113 or the external memory 120. Hereinafter, when there is not explicitly statement to the contrary, the CPU 111 performs determinations in processing using data of the RAM 112 and the ROM 113. Also, data used for determinations of the processing and processing results are all stored in the RAM 112 or in the external memory 120, and so description of such is omitted. Note, programs for the CPU 111 to operate are not limited to being stored in the ROM 113 and may also be pre-stored in the external memory (hard disk, etc.) 120.

The input controller 114 receives operations from the user, generates control signals in accordance with the operations and supplies them to the CPU 111. For example, the input controller 114 controls an interface with an input device for receiving user operations such as a character information input device such as a keyboard (not shown), a pointing device (not shown), or the touch panel 118. Note, the touch panel 118 is an input device for outputting coordinate information corresponding to a position that the user touched to an input unit that is configured level to the screen for example. The CPU 111 controls units of the information processing apparatus 101 in accordance with a program based on control signals generated and supplied by the input controller 114 in accordance with a user operation performed on the touch panel 118. With this, the information processing apparatus 101 is able to execute operation in accordance with operation of the user.

The display controller 115 outputs display signals for causing an image to display on the display unit 119. The CPU 111 supplies display control signals generated in accordance with a program to the display controller 115. The display controller 115 causes a GUI screen constituted in a GUI (Graphical User Interface) to be displayed on the display unit 119 based on these display control signals. Note, the previously described touch panel 118 is comprised in the same single body as the display unit 119. The touch panel 118 is configured so to have a light transmittance that does not obstruct display of the display unit 119 and is installed in an upper layer of a screen of the display unit 119. The CPU 111 associates input coordinates on the touch panel 118 with display coordinates on the display unit 119. With this, it is possible to configure a GUI by which a user can directly operate on an image displayed on a screen of the display unit 119. In embodiments below, the touch panel 118 and the display unit 119 are configured in a single body, and so together they are described as the touch panel 118.

An external memory 120 such as a hard disk (HD), an FD, a CD, a DVD, or a memory card, for example, may be mountable to the external memory I/F 116. Based on control of the CPU 111, the external memory I/F 116 performs reading out of data from the mounted external memory 120 and writing out of data to the external memory 120. The communication I/F controller 117 performs communication with, for example, a network 102 such as a LAN, the Internet, a wired network, or a wireless network based on control of the CPU 111.

Next, explanation will be given for a user operation on the touch panel 118.

When the user performs an operation on the touch panel 118, the CPU 111 receives a signal transmitted from the input controller 114, and determines what kind of operation was performed. As examples of operations that the CPU 111 is capable of determining there is a press operation and a release operation. The press operation is an operation in which the user presses the touch panel 118 with his or her finger (a stylus is also possible, but hereinafter the term finger will be used). On the other hand, an operation of the user releasing his or her pressed finger after the press operation is called the release operation. In a case where the user specified content such as a button or a list displayed on the touch panel 118, the press operation is performed on the content.

Also, another operation that the CPU 111 is capable of determining is a move operation. This move operation is a continuous operation in which the press operation specifying content on the touch panel 118 is maintained, the pressed finger is moved on the touch panel 118 and after that the release operation is performed. The press operation and the move operation are the same as the commonly known press operation and move operation, and so their details are omitted. Note, in present embodiments explanation is given using the move operation, but the drag operation, the flick operation and the swipe operation may be used instead of the move operation.

First Embodiment

Below, explanation will be given for the first embodiment of the present invention.

Figure 2:
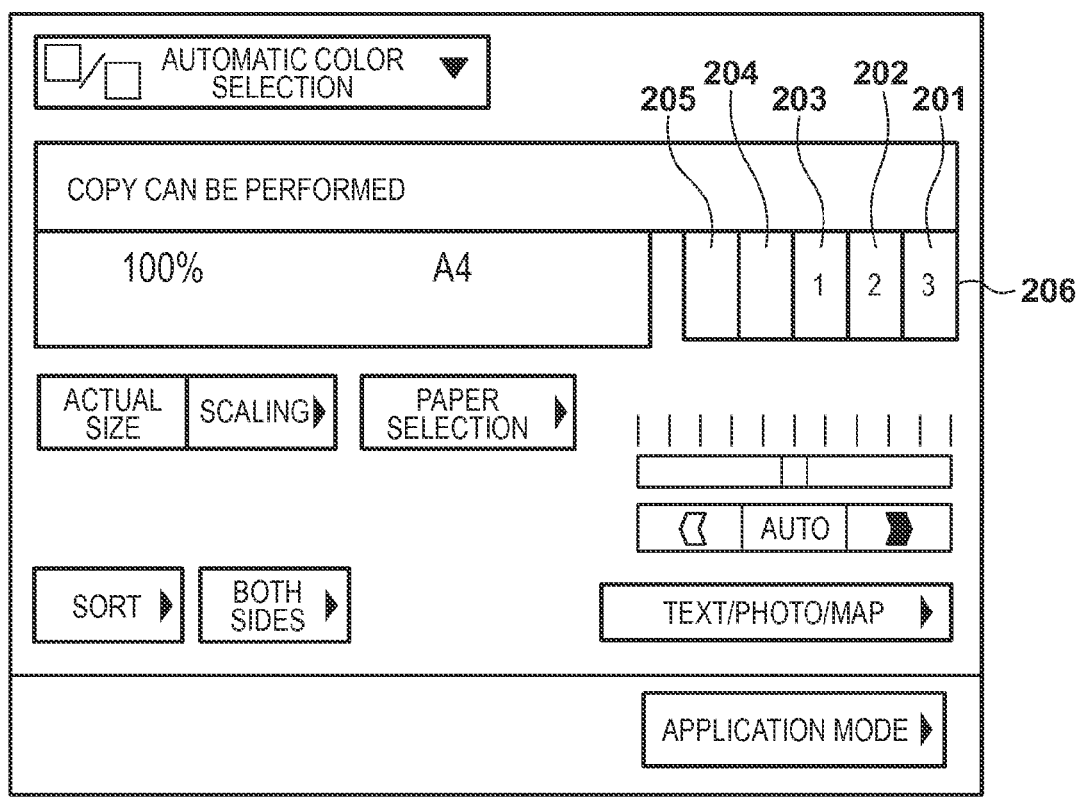
FIG. 2 is a view for showing an example of a copy setting screen displayed on a touch panel of the information processing apparatus according to a first embodiment.

FIG. 2 is a view for showing an example of a copy setting screen displayed on a touch panel 118 of the information processing apparatus 101 according to the first embodiment. This is showing one example of a copy setting screen for performing settings related to a copy function for a copy function that the information processing apparatus 101 has.

One of the settings performed on this copy setting screen is setting of a number of copies (positioned number). In a case where this setting value is changed, a numeric value displayed in a positioned number setting area (numeric value input area) 206 changes. An explanation of a concrete example of the first embodiment will be given with an example of numeric value input in the positioned number setting area 206.

Firstly, explanation will be given of user operation for changing a positioned number setting, and after that processing by the information processing apparatus 101 will be explained.

The positioned number setting area 206 is capable of having a five-digit number input into it. As areas into which this five-digit number is input, there are five digit position input areas from the ones digit position area 201 to the ten thousands digit position area 205. Positioned number setting and change is performed by changing the numerals of these digit position areas.

In FIG. 2, "3" is displayed in the ones digit position area 201, "2" is displayed in the tens digit position area 202 and "1" is displayed in the hundreds digit position area 203. Thus, the current positioned number is "123". Note, in FIG. 2, nothing is displayed in the thousands digit position area 204 or the ten thousands digit position area 205, and this is the equivalent to when "0" is displayed in these positions.

Note, firstly explanation will be given for operation for changing (increasing/decreasing) the numerals of these digit positions with the move operation in an upward/downward orientation in the digit position areas 201-205. This is similar to the conventional technique explained with reference to FIG. 11.

Each digit position area is capable of having the move operation performed on it in an upward/downward orientation, and the digit position numerals are changeable by performing the move operation in an upward or a downward direction in the digit position areas. A concrete example of this will be explained. In FIG. 2, "3" is displayed in the ones digit position area 201, but when the move operation is performed causing the ones digit position area 201 to move in a downward direction, the numeral of the ones digit position area 201 is changed (reduced) from "3" to "2". After that, if the move operation is further performed in a downward direction on the ones digit position area 201, the numeral of the ones digit position area 201 is changed to "1". On the other hand, in a state in which "3" is displayed in the ones digit position area 201, if the move operation is performed moving in an upward direction, the numeral of the ones digit position area 201 is changed (increased) to "4". After that, if the move operation is further performed in an upward direction on the ones digit position area 201, the numeral of the ones digit position area 201 is changed to "5". Note, the numerals "0"-"9" are arranged in a ring for each digit position area here, and when the move operation is performed in a downward direction in a state in which the numeral "0" is displayed, "9" will be displayed. Also, when the move operation is performed in an upward direction in a state in which the numeral "9" is displayed, "0" will be displayed. Note, explanation here is made having the numerals increase/decrease by 1 each time the move operation is performed, but the amount of increase/decrease need not be 1.

Next, explanation of operations for changing the numeral of the digit positions by performing the move operation instructing movement of the digit position area in a leftward/rightward orientation will be given. The digit position areas are capable of having the move operation performed on them in a leftward/rightward orientation, and the numeral displayed in each digit position can be moved to another digit position area with the move operation. Explanation of a concrete example of this will be given with reference to FIG. 3A and FIG. 3B.

FIG. 3A and FIG. 3B are views for explaining a concrete examples of a numeral movement of the positioned number setting area 206 due to a move operation in a leftward/rightward orientation in accordance with the first embodiment.

In numeral 301 of FIG. 3A, "123" is displayed in the positioned number setting area 206. In this state, the user performs the move operation, moving the numeral of the hundreds digit position area 203 to the thousands digit position area 204 on its left (the move operation in a leftward direction by 1 digit position). In accordance with the movement amount and the movement direction of this move operation, the numeral "1" of the hundreds digit position area 203 moves to the thousands digit position area 204 and in the same way the numeral "2" in the tens digit position area 202 moves to the hundreds digit position area 203 and the numeral "3" in the ones digit position area 201 moves to the tens digit position area 202. Furthermore, because the numeral in the ones digit position area 201 becomes undefined, a "0" is inserted and displayed here. With this, the numeric value of the positioned number setting area 206 becomes "1230" as shown in numeral 302.

Furthermore, in the state of numeral 302, when the move operation is performed moving the numeral "1" of the thousands digit position area 204 in a leftward direction by 1 digit position, the numeric value of the positioned number setting area 206 becomes "12300" as shown in numeral 303.

Furthermore, in the state of numeral 303, when the move operation is performed moving the numeral "1" of the ten thousands digit position area 205 in a leftward direction by 1 digit position, the numeric value of the positioned number setting area 206 becomes "23000" as shown in numeral 304.

Note, in the state of numeral 301 in FIG. 3A, when the move operation is performed moving the numeral "1" of the hundreds digit position area 203 in a leftward direction by 2 digit positions (the move operation moving the numeral of the hundreds digit position area 203 to the ten thousands digit position area 205), the state shown in numeral 303 is entered. Similarly, in the state of numeral 301 in FIG. 3A, when the move operation is performed moving the numeral "1" of the hundreds digit position area 203 in a leftward direction by 3 digit positions (the move operation moving the numeral of the hundreds digit position area 203 to a position left of the ten thousands digit position area 205), the state shown in numeral 304 is entered.

Next, explanation will be given with reference to FIG. 3B for the move operation in a rightward direction.

Assume that the move operation is performed moving the numeral "1" in the hundreds digit position area 203 in a rightward direction by 1 digit position in a state in which the numeric value of the positioned number setting area 206 is "123" as shown in numeral 310 of FIG. 3B. In accordance with a movement amount and a movement direction of the move operation, the numeral of the hundreds digit position area 203 moves to the tens digit position area 202, the numeral of the tens digit position area 202 moves to the ones digit position area 201, and the numeral "3" displayed in the ones digit position area 201 is discarded (deleted). With this, the numeric value of the positioned number setting area 206 becomes "12" as shown in numeral 311. In the state of numeral 311, when the move operation is performed moving the numeral "1" of the tens digit position area 202 in a rightward direction by 1 digit position, the numeric value of the positioned number setting area 206 becomes "1" as shown in numeral 312. Furthermore, in the state of numeral 312, when the move operation is performed moving the numeral "1" of the ones digit position area 201 in a rightward direction by 1 digit position, the numeric value of the positioned number setting area 206 becomes "0" as shown in numeral 313. Note, similarly to the move operation in a leftward direction in FIG. 3A, it is possible to perform the move operation in the rightward direction by multiple digit positions. For example, in the state of numeral 310, when the move operation is performed moving in the rightward direction by 2 digit positions (the move operation moving the numeral "1" of the hundreds digit position area 203 to the ones digit position area 201), a state shown in numeral 312 is entered.

This concludes the explanation of operations for changing the numeral of the digit positions by performing the move operation moving the numerals of the digit position areas in a leftward/rightward orientation. Note, in the above explanation, when the move operation is performed in the leftward/rightward orientation, assumption was made that the user performs the move operation having selected the most significant digit position of the numeric value displayed in the positioned number setting area 206, but the same result is achieved by performing the move operation moving in a leftward/rightward orientation having selected a numeral of another digit position. Specifically, if the move operation is performed moving the numeral "2" of the tens digit position area 202 in a leftward direction by one digit position in the state of numeral 301 in FIG. 3A, a state shown in numeral 302 is entered.

Next, explanation will be given for processing of the information processing apparatus 101 when the move operation is performed in the leftward/rightward orientation as described above, with reference to the flowchart of FIG. 4. Note, processing corresponding to the move operation in the upward/downward orientation explained in the conventional technique is known and thus explanation thereof will be omitted.

Figure 4:
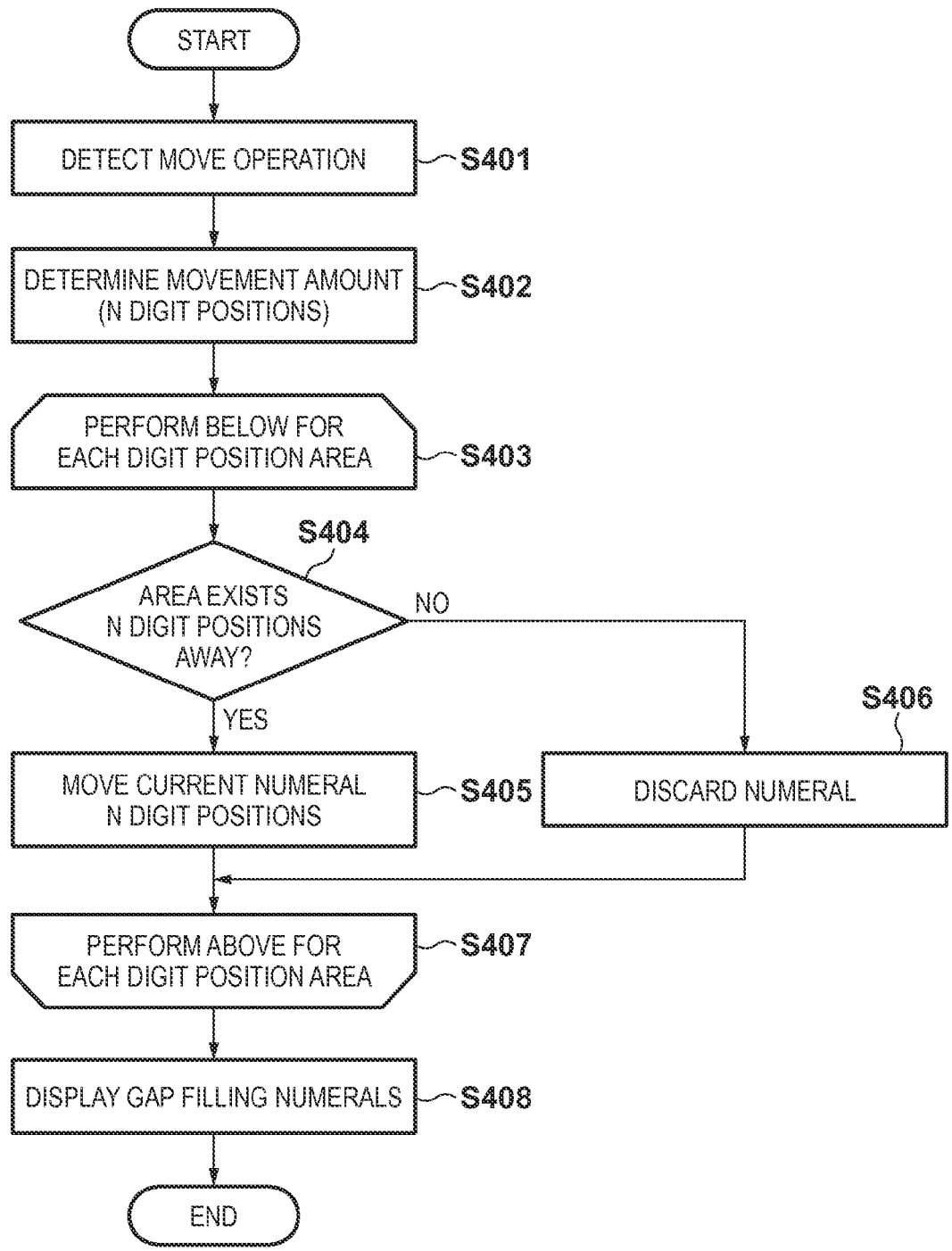
FIG. 4 is a flowchart for describing processing for when a user moves a numeral of the positioned number setting area in a leftward/rightward orientation in the information processing apparatus according to the first embodiment.

FIG. 4 is a flowchart for describing processing for when a user moves a numeral of the positioned number setting area 206 in a leftward/rightward orientation in the information processing apparatus according to the first embodiment. Note, this processing is realized by the CPU 111 executing a program stored in ROM 113 or the external memory 120.

Firstly, in step S401, the CPU 111 detects that the user performed the move operation in either a rightward or a leftward direction with respect to the positioned number setting area 206 on the touch panel 118 based on a signal from the input controller 114. Next, the processing proceeds to step S402 and the CPU 111, having detected the move operation, calculates a movement direction and a movement amount of the move operation using the input controller 114. There are multiple calculation methods for this, but here it is assumed that the following calculation is performed. Firstly, the CPU 111 calculates what distance was moved in the leftward or rightward direction based on coordinates of the press operation and the release operation. Then the CPU 111 calculates the movement amount which indicates how many digit positions was the move in the leftward or rightward direction based on a display width of the digit position areas of the positioned number setting area 206 which is pre-stored in the RAM 112. Next, the CPU 111 stores the calculated movement amount into the RAM 112. This is the calculation method of the movement direction and the movement amount. Note, the movement amount acquired with this calculation is referred to as N digit positions, movement of N digit positions in a leftward direction is referred to as an N digit position movement and movement of N digit positions in a rightward direction is referred to as a −N digit position movement. The CPU 111 performs actual movement processing of a moved numerals displayed in the digit position areas of the positioned number setting area 206 in step S403 through step S407 after having calculated the movement amount (N digit positions) in step S402. Note, the processing in FIG. 4 in step S403 through step S407 is performed on each of the digit positions of the positioned number setting area 206.

This processing will now be explained. The CPU 111 acquires information from the RAM 112 as to how many digit position areas are displayed in the positioned number setting area 206 displayed on the touch panel 118 (hereinafter the acquired number of digit positions is referred to as the maximum displayed digit positions). In the case previously described with FIG. 3A and FIG. 3B, the maximum displayed digit positions of the positioned number setting area 206 stored in the RAM 112 is "5". Next processing of step S404 through step S406 is performed on the digit position areas. Note, in the first embodiment processing on the digit position areas is performed from the most significant digit position (the leftmost digit position).

Firstly, the CPU 111, in step S404, determines whether or not a digit position area exists in the positioned number setting area 206 at a position separated from the current digit position area by the movement amount acquired in step S402 (N digit positions). In a case where it is determined that the digit position area does exist N digit positions away from the current digit position area, the processing proceeds to step S405, and the numeral displayed in the current digit position area is made to be the numeral of the digit position area positioned the N digit positions away from the current digit position area. On the other hand, if it is determined that no digit position area exists N digit positions away from the current digit position area, the processing proceeds to step S406 and the CPU 111 discards the numeral of this digit position area. This processing is executed for the numerals of each of the digit positions of the positioned number setting area 206. After completing the movement of the numerals of the digit positions is this way, the processing proceeds to step S408 and in the positioned number setting area 206 gap-filling processing is performed as in, for example, numeral 302 through numeral 304 and numeral 311 through numeral 313 in FIG. 3.

Next, this gap-filling processing will be explained. The CPU 111 acquires a movement distance calculated in step S402 from the RAM 112 and determines whether or not this value is a positive number. Depending on the result of this the digit position area into which a gap-filling value is inserted differs. In a case of a positive number, the CPU 111 displays the gap-filling value (here "0") stored in the RAM 112 in the ones digit position area 201 through to the Nth digit position area from the right. On the other hand, in the case of a negative number, the gap-filling value (here "0") stored in the RAM 112 is displayed in the digit position areas from the most significant digit position (hereinafter, the area at the Mth digit position from the right) through to the digit position area at (M+N+1) digit positions from the right. Note, in FIG. 3B, because of a zero suppression function, gap-filling "0"s due to the move operation in the rightward direction in the positioned number setting area 206 are not displayed. This concludes the explanation of the gap-filling processing.

Next, specific explanation of operation of the flowchart of FIG. 4 will be given with reference to FIG. 3A. Here, a concrete example will be explained for when the user performs the move operation moving three digit positions in a leftward direction in the state of numeral 301 of FIG. 3A.

Because the move operation was performed moving three digit positions in a leftward direction, first of all in step S404 it is determined whether or not there exists a ten millions digit position area three digit positions to the left of the ten thousands digit position area 205 which is at the Mth digit position from the right in the positioned number setting area 206. Because the maximum displayed digit positions of the positioned number setting area 206 is "5", it is determined that there is no ten millions digit position area, the processing proceeds to step S406, and the numeral "0" of the ten thousands digit position area 205 is discarded. Next, in step S404, it is determined whether or not there exists a millions digit position area three digit positions to the left of the thousands digit position area 204. Because the maximum displayed digit positions of the positioned number setting area 206 is "5", it is determined that there is no millions digit position area, the processing proceeds to step S406, and the numeral "0" of the thousands digit position area 204 is discarded. Next, for the hundreds digit position area 203, in the same way, in step S404, it is determined whether or not a hundred thousands digit position area exists. Here, because the maximum displayed digit positions of the positioned number setting area 206 is "5", it is determined that no hundred thousands digit position area exists, the processing proceeds to step S406 and the numeral "1" of the hundreds digit position area 203 is discarded. Next, in step S404, similarly, it is determined whether or not a ten thousands digit position area exists three digit positions in a leftward direction in relation to the tens digit position area 202. Because the maximum displayed digit positions of the positioned number setting area 206 here is "5", it is determined that the ten thousands digit position area does exist, the processing proceeds to step S405, and the numeral "2" of the tens digit position area 202 is moved to and displayed in the ten thousands digit position area 205. Next, when similar processing is performed on the ones digit position area 201, because the thousands digit position area exists, the processing proceeds to step S405 and the numeral "3" of the ones digit position area 201 is moved to and displayed in the thousands digit position area 204.

In this way, by looping through step S403 through step S407, when movement processing for moving the numerals of the digit positions of the positioned number setting area 206 completes, the processing proceeds to step S408 and for the gap-filling processing it is determined whether or not N is a positive number. Here, because N is a positive number (here it is "3"), "0"s are displayed in the ones digit position area 201 through the hundreds digit position area 203. With this, as shown in numeral 304 of FIG. 3A, "23000" is displayed in the positioned number setting area 206.

Next, explanation will be given for another concrete example of the movement processing and the gap-filling processing with reference to FIG. 3B.

A concrete example will be explained for a case where the move operation was performed moving three digit positions to the right in the state of numeral 310 of FIG. 3B. In the example, for the ten thousands digit position area 205 and the thousands digit position area 204, the determination of step S404 is YES, and their numeral "0" is moved to and displayed in the tens digit position area 202 and the ones digit position area 201 respectively. However, in FIG. 3B, other than in the ones digit position area 201 "0" is not displayed in the digit position areas. Note, in the hundreds digit position area 203 through to the ones digit position area 201, because the determination in step S404 is NO, the processing proceeds to step S406, and the numerals of each of the digit position areas "1", "2" and "3" are each discarded.

When the movement processing of the numerals for the digit positions of the positioned number setting area 206 completes, the processing proceeds to step S408 and the gap-filling processing is performed. Because in this concrete example N is a negative number (here it is "−3"), "0"s are inserted in the Mth digit position from the right through to the digit position area at (M+N+1) digit positions from the right, i.e. the ten thousands digit position area 205 through to the hundred digit position area 203. With this, as in numeral 313 of FIG. 3B, a "0" is displayed in the positioned number setting area 206. Note, in the first embodiment, other than the ones digit position area 201, in a case where the numeral is "0" it has be made to not be displayed, but in some embodiments a "0" is displayed here (in other words, in numeral 313 of FIG. 3B, "00000" may be displayed).

This concludes explanation of processing when the move operation is performed in a leftward/rightward orientation in the first embodiment. In this way, by moving the numerals of the digit positions when the move operation is performed in a leftward/rightward orientation, even in a case where a numeric value with many digit positions is input, the user is able to easily input numeric values. Also, there is an effect that correction when the digit position of the input numeral was incorrect can be performed easily and intuitively.

Note, in the first embodiment, the move operation in a leftward/rightward orientation is made possible in the positioned number setting area 206, but configuration may also be taken to restrict the move operation in a leftward/rightward orientation in a case where input of another setting value is performed on the information processing apparatus 101. For example, in a case of input of a numeric value related to security such as a password number, setting information restricting the move operation in a leftward/rightward orientation is stored beforehand in the RAM 112, and determination of whether or not to perform processing is made by referencing these settings when the move operation is detected in step S401.

Also, in the first embodiment, in the gap-filling processing, the numeral newly displayed in the ones digit position area 201 is made to be "0", but configuration may be made to input a constant value other than "0" or a predetermined numeral. There are also embodiments in which, for example, a cache function to store setting values is arranged for the information processing apparatus 101, a value, once input, is stored in the RAM 112, and corresponding numeric values are acquired from the RAM 112 in accordance with values the user input and displayed in the ones digit position area 201. Specifically, in such embodiments, in a case where the number of copies is set using the positioned number setting area 206 as the number "123", the number "123" is stored in the RAM 112. Then, in the next copy operation, when the move operation is executed moving one digit position in a leftward direction in a state in which "12" is displayed in the positioned number setting area 206, "3" is displayed in the ones digit position area 201 and the setting value is set to "123".

Also, in the first embodiment, when the move operation is performed in the leftward/rightward orientation, the same movement processing is executed on all of the digit position areas, regardless of which digit position area of the positioned number setting area 206 the move operation was performed on. However, in other embodiments the movement processing is performed on only a portion of the digit position areas in accordance with the digit position area on which the user performed the move operation. For example, assuming that the digit position area on which the move operation is initiated is the Yth digit position area from the right, in a case where the move operation is performed in a leftward direction, the areas from the least significant digit position area to the (Y−1)th digit position area from the right are made not to be targets of the move. Also, in a case where the move operation is performed moving in a rightward direction, areas from the most significant digit position area to the (Y+1)th digit position area from the right are made not to be targets of the move.

Figure 5A:
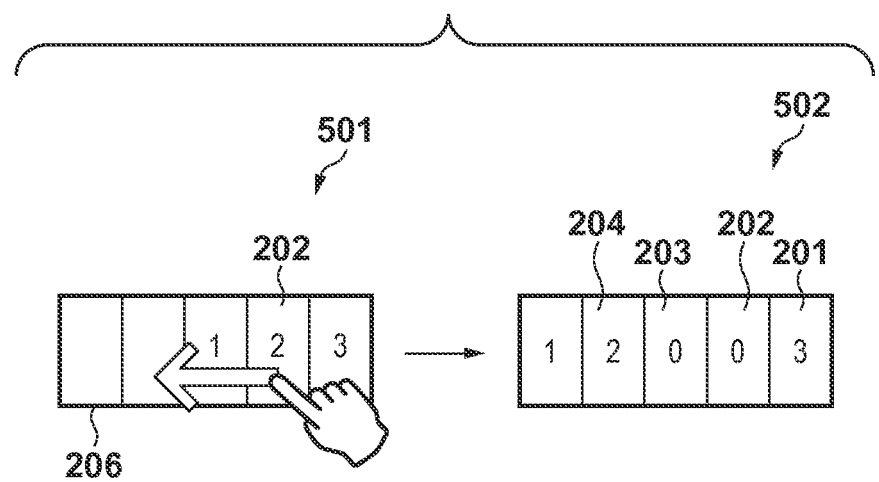
FIG. 5A and FIG. 5B are views for explaining another form of the first embodiment.
Figure 5B:
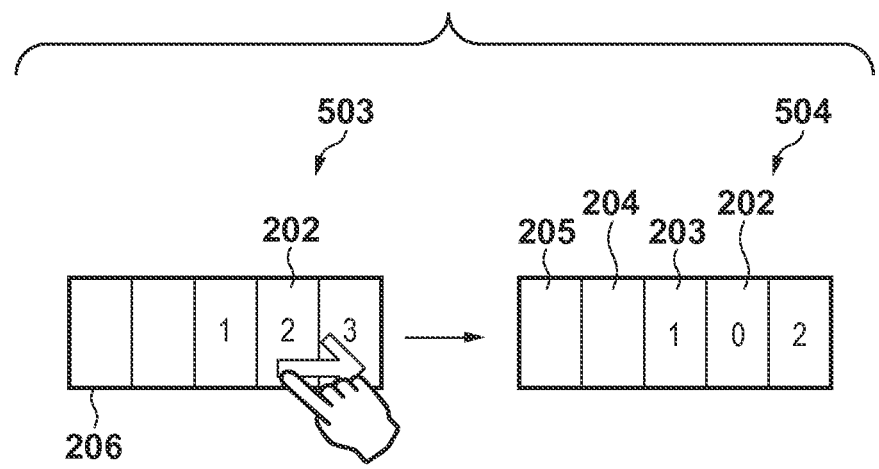

FIG. 5A and FIG. 5B are views for explaining another form of the first embodiment.

Specifically, in numeral 501 in FIG. 5A, in a case where the move operation is performed moving two digit positions in a leftward direction from the tens digit position area 202, the numeral of the ones digit position area 201 "3" is not a target and so is not changed. Then, as shown in numeral 502 of FIG. 5A, the gap-filling value (here it is "0") can be input into the hundreds digit position area 203 and the tens digit position area 202.

Similarly, in numeral 503 of FIG. 5B, in a case where the move operation is performed moving one digit position in a rightward direction from the tens digit position area 202, the numerals of the areas from the ten thousands digit position area 205 through to the hundreds digit position area 203 are not targets and so they are not changed. Then, as in numeral 504 of FIG. 5B, the gap-filling value (here it is "0") may be input into the tens digit position area 202.

In this way, when the move operation is performed in the positioned number setting area 206, it is distinguished which digit position is designated, and movement of only the numeral of the digit positions existing in a direction in which the movement is specified from the distinguished digit position may be performed.

Second Embodiment

In the previously described first embodiment, regarding the numeric value of the positioned number setting area 206, consideration of maximum values and minimum values was not made. For this reason, the numeric values moved to the left of the ten thousands digit position area 205 and the numeric values moved to the right of the ones digit position area 201 with the move operation are always discarded (step S406), and a value identical to the value newly gap-filled in the ones digit position area 201 is used (step S408). In contrast to this, in the second embodiment, explanation will be given for processing which considers a minimum value and a maximum value of the numeric values set in the positioned number setting area 206 with reference to the flowchart of FIG. 6. Note, an example in which the positioned number setting of FIG. 2 is performed is used as a concrete example. Note, because the configuration of the information processing apparatus 101 according to the second embodiment is the same as in the first embodiment, only explanation of parts differing from the first embodiment will be made.

Figure 6:
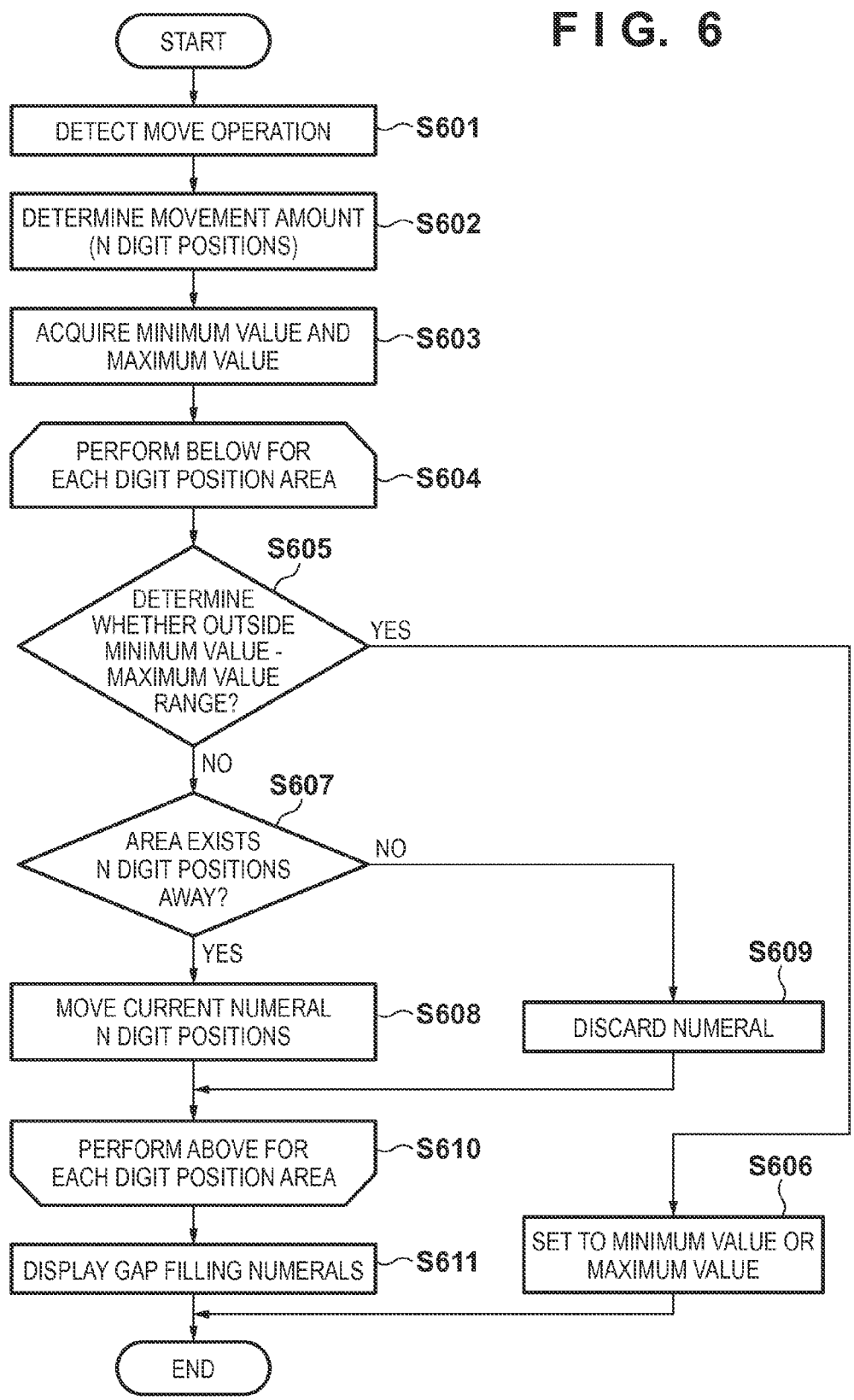
FIG. 6 is a flowchart for describing processing for when a user moves a numeral of the positioned number setting area in a leftward/rightward orientation in the information processing apparatus according to a second embodiment of the present invention.

FIG. 6 is a flowchart for describing processing for when a user moves a numeral of the positioned number setting area in a leftward/rightward orientation in the information processing apparatus according to the second embodiment of the present invention. Note, this processing is realized by the CPU 111 executing a program stored in ROM 113 or the external memory 120. Note, because processing in step S601 and step S602 in FIG. 6 is the same as that of step S401 and step S402 in FIG. 4 of the first embodiment, explanation will be made from processing after the movement amount is calculated.

The CPU 111, in step S602, after calculating the movement amount moves the processing on to step S603 and a minimum value and a maximum value of the setting value of the numeric value input area for which the move operation is detected (in second embodiment this is the positioned number setting area 206) are acquired from the RAM 112. Note, the minimum value and the maximum value are configured to be constant in the second embodiment, but in other embodiments, they may change in accordance with the state of the information processing apparatus 101 (the utilization rate of the CPU or memory, option configuration).

Next, in step S604 through to step S610, the CPU 111 performs processing on the digit position areas of the positioned number setting area 206. Firstly, in step S605, the CPU 111 determines whether or not the numeric value of the positioned number setting area 206 will become a numeric value outside of a range from the minimum value acquired in the step S603 to the maximum value acquired in the step S603 (out of range) when moved in the movement direction calculated in step S602 by the movement amount. When, this determination result is that it is not determined that the numeric value of the positioned number setting area 206 will be out of range (a case where step S605 is NO), the CPU 111 performs the movement processing in step S607 through step S609 as in step S404 through step S406 in the first embodiment.

On the other hand, when the determination result is that it is determined that the numeric value of the positioned number setting area 206 will be out of range (a case where step S605 is YES), the processing proceeds to step S606 and the CPU 111 sets the numeric value of the positioned number setting area 206 to be the minimum value or the maximum value and completes the processing. Note, the CPU 111 determines whether to set to the minimum value or to the maximum value based on whether the direction of the move operation is performed to the left or to the right. Specifically, in a case where the move operation is performed in a leftward direction, the maximum value is set, and in a case where the move operation is performed in a rightward direction, the minimum value is set.

Explanation of concrete examples of this will be given with reference to FIG. 7A and FIG. 7B.

Figure 7A:
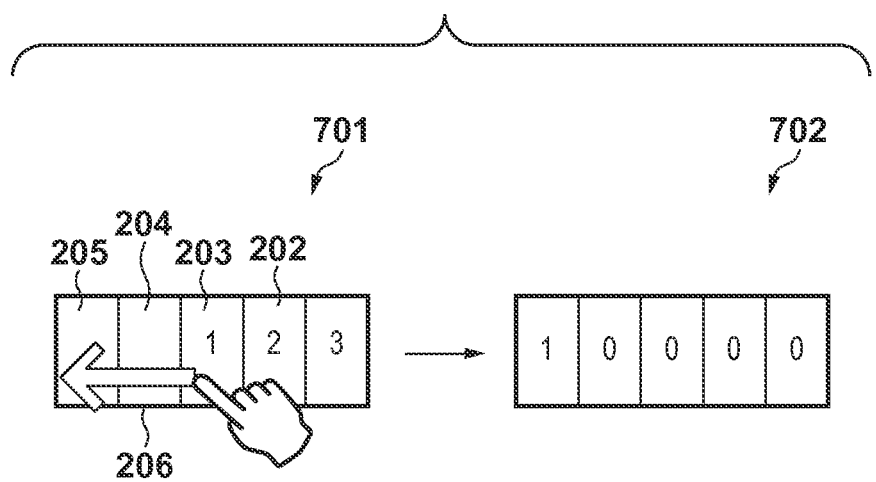
FIG. 7A and FIG. 7B are views for explaining concrete examples of a numeral movement of the positioned number setting area due to a move operation in a leftward/rightward orientation in accordance with the second embodiment.
Figure 7B:
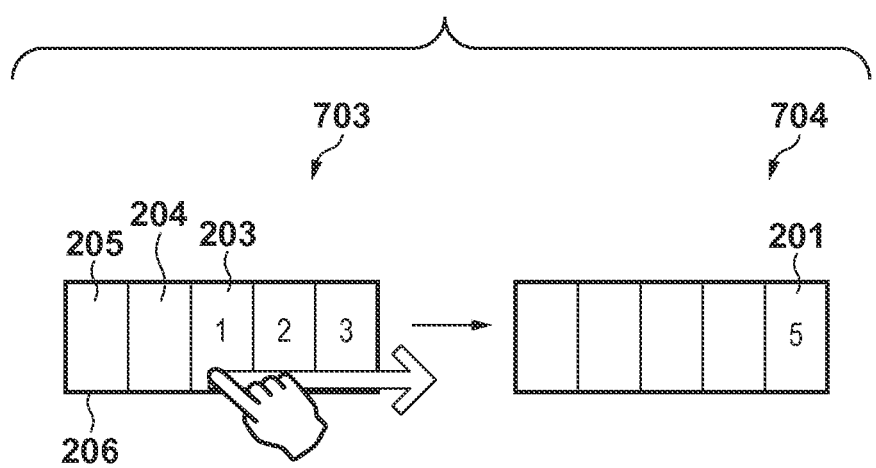

FIG. 7A and FIG. 7B are views for explaining concrete examples of a numeral movement of the positioned number setting area 206 due to the move operation performed in a leftward/rightward orientation in accordance with the second embodiment.

Assume that the positioned number setting area 206 is in the state of numeral 701 of FIG. 7A, and that the move operation is performed by the user in a leftward direction moving two digit positions. In this case, the CPU 111, in step S605, performs a determination of whether or not the numeric value is within range based on the numeral of the ten thousands digit position area 205. Note, here it is assumed that for the positioned number setting area 206 in the RAM 112 a minimum value of "5" and a maximum value of "10000" is stored. Because the numeric value of the ten thousands digit position area 205 ("0") will be moved left of the ten thousands digit position area 205 by the move operation in a leftward direction by two digit positions, at this stage it will not yet be determined whether or not the value will be out of range. Accordingly, because it is not determined that the numeric value of the positioned number setting area 206 will be out of range, the movement processing of step S607 through step S608 is performed. In this case, the CPU 111, in step S605, performs a determination of whether or not the numeric value is within range based on the numeral of the thousands digit position area 204. Because the numeric value of the thousands digit position area 204 ("0") will be moved left of the ten thousands digit position area 205 by the move operation in a leftward direction by two digit positions, at this stage it will not yet be determined whether or not the value will be out of range.

Next the CPU 111, in step S605, performs a determination of whether or not the numeric value is within range based on the numeral of the hundreds digit position area 203. Here, the numeric value of the hundreds digit position area 203 is "1", and so when this numeric value is moved to the ten thousands digit position area 205, the numeric value of the positioned number setting area 206 will become "1XXXX" (the Xs are values from 0-9). For this reason, the numeric value of the positioned number setting area 206 will be greater than or equal to the minimum value "5" acquired in step S603 and could be less than or equal to the maximum value (for example, in the case where all of the X's are O's, the numeric value of the positioned number setting area 206 will become "10000"). Accordingly, because it is not determined that the numeric value of the positioned number setting area 206 will be out of range, the movement processing of step S607 through step S608 is performed.

Next the CPU 111, in step S605, performs a determination of whether or not the numeric value is within range based on the numeral of the tens digit position area 202. Because the numeric value of the tens digit position area 202 is "2", when this numeric value is moved to the thousands digit position area 204, the numeric value of the positioned number setting area 206 will become "12XXX" (the Xs are values from 0-9). For this reason, while the numeric value of the positioned number setting area 206 will be greater than or equal to the minimum value "5" obtained in step S603, it will not be less than or equal to the maximum value "10000". Because of this, in step S605, with the movement of the tens digit position area 202, it is determined that the numeric value of the positioned number setting area 206 will not be within range between the minimum value and the maximum value, and so the processing proceeds to step S606, and the CPU 111 changes the numeric value of the positioned number setting area 206 to be the maximum value "10000" and completes the processing. With this, the state shown in numeral 702 of FIG. 7A will be entered.

Another concrete example will be explained with reference to FIG. 7B.

Assume that with the positioned number setting area 206 in the state of numeral 703 of FIG. 7B, the move operation is performed by the user in a rightward direction moving by two digit positions. In this case, the CPU 111, in step S605, performs a determination of whether or not the numeric value is within range based on the numeral of the ten thousands digit position area 205. Because the CPU 111 at this stage has not determined whether or not the numeric value of the positioned number setting area 206 will be out of range, the movement processing of step S607 through step S608 is performed. Next, the CPU 111, in step S605, performs a determination of whether or not the numeric value is within range based on the numeral of the thousands digit position area 204. Because the CPU 111 at this stage has not determined whether or not the numeric value of the positioned number setting area 206 will be out of range, the movement processing of step S607 through step S608 is performed.

Next the CPU 111, in step S605, performs a determination of whether or not the numeric value is within range based on the numeral of the hundreds digit position area 203. Here, because the numeral of the hundreds digit position area 203 is "1", when this numeral is moved to the ones digit position area 201, the numeric value of the positioned number setting area 206 will be "1". For this reason, the numeric value of the positioned number setting area 206 will be less than the minimum value "5" acquired in step S603, and so the CPU 111 determines that it will be out of range with respect to the range from the minimum value to the maximum value, and moves the processing on to step S606. In this case, the CPU 111, in step S606, changes the numeric value of the positioned number setting area 206 to be the minimum value "5" and completes the processing. With this, the state shown in numeral 704 of FIG. 7B will be entered.

This concludes explanation of the second embodiment. By considering the minimum value and the maximum value set for the positioned number setting area 206 as in the second embodiment, the user can avoid errors due to input of numeric values that are out of range with respect to the minimum value and the maximum value into the positioned number setting area 206 before they occur.

Also, when the user wishes to enter the minimum value or the maximum value, he or she can input all of the numeric values of the digit positions without inputting the numeric value for each digit position, by performing the move operation moving the digit positions in a leftward/rightward orientation. With this operability for the user is improved.

Note, in the second embodiment, in step S605 when the numeric value of the positioned number setting area 206 is determined to be out of range, the minimum value or the maximum value is set in step S606, but in other embodiments step S606 is not performed and the processing is completed (the move operation can be made to be invalid). In this case, because the user cannot execute the move operation, input of numeric values other than those that are within range with respect to the minimum value and the maximum value can be prevented.

Third Embodiment

In the previously described first embodiment, for the numeric value of the positioned number setting area 206, the display of supplementary information to make the numeric value easier to see or to make the digit position of the numeric value easier to distinguish is not considered. In the third embodiment, explanation is given of processing for displaying supplementary information for the positioned number setting area 206 with reference to the flowchart of FIG. 8. By displaying supplementary information it become possible for the user to perform numeric value input more easily (particularly so when there are numerous digit positions in the positioned number setting area 206). Note, the basic configuration and control of the information processing apparatus 101 according to the third embodiment is the same as the previously described first embodiment and so explanation is only given for points differing from the first embodiment.

Figure 8:
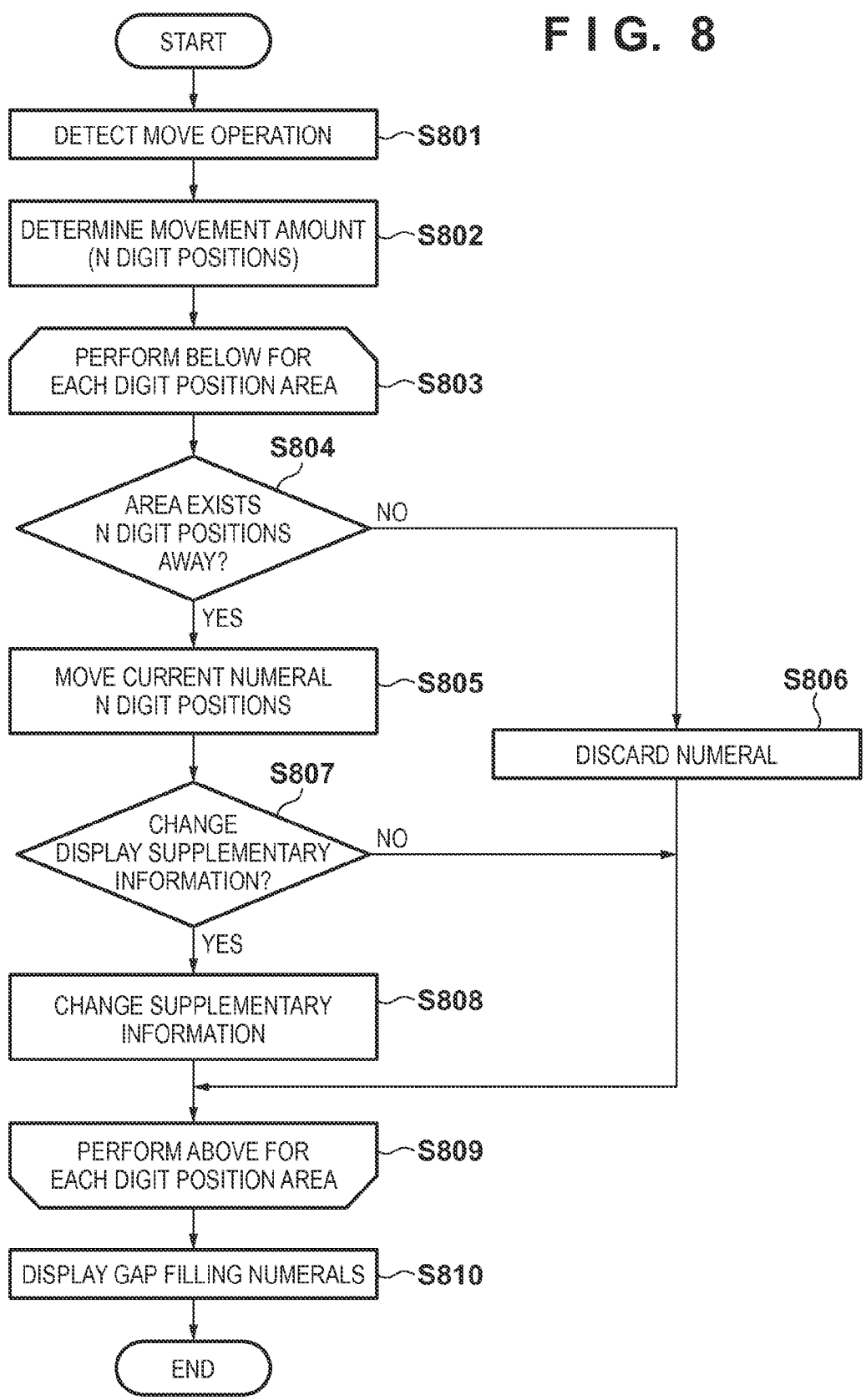
FIG. 8 is a flowchart for describing processing for when a user moves a numeral of the positioned number setting area in a leftward/rightward orientation in the information processing apparatus according to a third embodiment of the present invention.

FIG. 8 is a flowchart for describing processing for when a user moves a numeral of the positioned number setting area in a leftward/rightward orientation in the information processing apparatus according to the third embodiment of the present invention. Note, this processing is realized by the CPU 111 executing a program stored in ROM 113 or the external memory 120. Note, because processing in step S801 through step S806, step S809 and step S810 in FIG. 8 is the same as that of step S401 through step S406 of FIG. 4 of the previously described first embodiment, explanation will be made from processing after the numeric value of the digit position area is moved in step S805.

The CPU 111 determines whether or not to change display of the supplementary information in step S807 after the processing of step S805. There are many possible methods of doing this determination, but here it is determined whether or not the digit position area after the move in step S805 is the leftmost digit position area displaying a numeric value other than the numeral "0". In other words, only for the digit position area that holds a numeral other than "0" and is the leftmost digit position area of the positioned number setting area 206 will this determination result in YES. In a case where, in step S807, it is determined that the display of the supplementary information is to change, the processing proceeds to step S808, and the CPU 111 extracts the supplementary information pre-stored in the RAM 112 associated with the digit position areas and changes the display of determined areas with the extracted supplementary information. After changing the supplementary information in this way, the processing of step S804 through step S809 is repeated on the next digit position area in the same way as in the first embodiment. On the other hand, when, in step S807, it is determined that the display of the supplementary information will not be changed, the CPU 111 repeats the processing of step S804 through step S809 for the next digit position area without changing the display of the supplementary information. This concludes the explanation of the internal processing for displaying the supplementary information.

A concrete example of this will be explained with reference to FIG. 9.

FIG. 9 is a view for explaining a concrete example of a numeral movement of the positioned number setting area 206 due to a move operation in a leftward/rightward orientation according to the third embodiment.

For the positioned number setting area 206, as shown in numeral 901 of FIG. 9, a "1" is displayed, and for the supplementary information display area 910 "ones" is displayed. This is displaying that the digit position of the numeral "1" is the "ones" digit position. Note, this supplementary information is information corresponding to each digit position area, and is pre-stored in the RAM 112. Specifically, the supplementary information of the ones digit position area 201, the tens digit position area 202, the hundreds digit position area 203, the thousands digit position area 204 and the ten thousands digit position area 205 is "ones", "tens", "hundreds", "thousands", "ten thousands" respectively, and these are each associated and stored in the RAM 112. Note, in FIG. 9, the supplementary information display area 910 is displayed under the positioned number setting area 206 but in other embodiments the positioned number setting area 206 is displayed in other positions around the positioned number setting area 206.

Explanation will be given for a case where the user performs the move operation moving one digit position in a leftward direction in the state of numeral 901 of FIG. 9. When the CPU 111 detects the move operation in step S801, it calculates the movement direction and the movement amount in step S802. Here, the movement amount is "1" for 1 digit position. Next, the CPU 111, in step S804, determines whether or not the hundred thousands digit position area exists one digit position to the left of the ten thousands digit position area 205. Here, because the hundred thousands digit position area does not exist, the CPU 111 performs the processing of step S806 and completes the processing for the ten thousands digit position area 205.

Next, the processing is performed for the thousands digit position area 204. When the determination of step S804 is performed for the thousands digit position area 204, because the ten thousands digit position area 205 exists, the processing proceeds to step S805 and the processing is performed. Further, in step S807, determination of whether or not the display of the supplementary information will change is made. Here, because the numeric value of the ten thousands digit position area 205 after the movement is "0", it is determined that the display of the supplementary information will not be changed, and the processing for the thousands digit position area 204 concludes. Next the processing is performed for the hundreds digit position area 203 and the tens digit position area 202 and similarly to the thousands digit position area 204 in the determination of whether the display of the supplementary information will change in step S807, it is determined that the display of the supplementary information will not change, and the processing for each of these digit position areas concludes.

Finally, the processing is performed for the ones digit position area 201. When the determination of step S804 is performed for the ones digit position area 201, because the tens digit position area 202 exists, the processing proceeds to step S805. Furthermore, in step S807, determination of whether or not the display of the supplementary information changes is performed. Here, the numeric value of the tens digit position area 202 after the movement is "1", and so it is determined that the tens digit position area 202 after the movement is the leftmost digit position that is not "0". For this reason, it is determined that the display of the supplementary information is to be changed, the processing proceeds to step S808, and the supplementary information of "tens" is acquired from the RAM 112 as supplementary information for the tens digit position area 202 after the movement. Next, the supplementary information is displayed in the supplementary information display area 910. With this, a state is entered in which the supplementary information indicating that the numeral "1" is displayed in the "tens" digit position is displayed. This concludes the concrete example for a case where the user performed the move operation moving one digit position in a leftward direction in the state of numeral 901 in FIG. 9. With this, it can be easily recognized that the numeral "1" which corresponded to the "ones" position in the state of numeral 901, is moved to the "tens" position by the move operation moving on digit position in a leftward direction.

Similarly, in the state of numeral 902 of FIG. 9, when the move operation is performed moving one digit position in a leftward direction, in the processing for the tens digit position area 202, the determination in step S807 results in YES. The processing proceeds to step S808 and "hundreds" is acquired from the RAM 112 as the supplementary information for the hundreds digit position area 203 after the movement, and this is displayed in the supplementary information display area 910. The result is that the state shown in numeral 903 is entered. With this, it can be easily recognized that the numeral "1" which corresponded to the "tens" position in the state of numeral 902, is moved to the "hundreds" position by the move operation moving on digit position in a leftward direction.

This concludes explanation of the third embodiment. By displaying supplementary information such as a unit or a marker that assists in recognition of the input numeric value, as in the third embodiment, the user can more clearly understand which digit position area was moved to with the move operation. Because of this, the input values can be more precisely recognized and the operability for inputting numeric values can be improved.

Note, in the third embodiment, explanation was given for a case in which there is one supplementary information display area, but in other embodiments multiple supplementary information display areas exist.

FIG. 10 is a view for explaining a concrete example of a numeral movement of the positioned number setting area due to a move operation in a leftward/rightward orientation as a variation of the Third Embodiment.

In FIG. 10, the positioned number setting area has seven digit position areas 211 through 217 and both a supplementary information display area 1001 and a supplementary information display area 1002 are provided. Also, as conditions for performing change of the display of the supplementary information in step S807, there is a change condition of the supplementary information display area 1001 and a change condition of the supplementary information display area 1002. The change condition of the supplementary information display area 1001 is that a numeric value other than "0" exists in a thousands digit position area 214 or in a digit position area to the left thereof upon the move operation. The change condition of the supplementary information display area 1002 is that a numeric value other than "0" exists in a millions digit position area 217 or in a digit position area to the left thereof upon the move operation. Also, assume that as the supplementary information, a symbol indicating a delimitation of the numeral (comma) "," is pre-stored in the RAM 112.

When in the state of numeral 1010 of FIG. 10, the move operation is performed moving three digit positions in a leftward direction as shown in numeral 1011, a "," is displayed in the supplementary information display area 1001 as shown in numeral 1012. Furthermore, when the move operation is performed moving three digit positions in a leftward direction from this state, a "," is displayed not only in the supplementary information display area 1001 but also in the supplementary information display area 1002 as shown in numeral 1013. In this way, by having multiple supplementary information display areas and displaying supplementary information which makes it easier to distinguish the numeral there, the user can more precisely recognize input values.

Other Embodiments

The above described information processing apparatus 101 includes various apparatuses in other embodiments. For example, in some embodiments the information processing apparatus 101 includes a personal information processing apparatus, a PDA, a mobile telephone terminal, a printer, a scanner, a FAX machine, a copy machine, a multi function device, a camera, a video camera, other image viewers, or the like.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-229245, filed Oct. 16, 2012, which is hereby incorporated by reference herein in its entirety.

What is claimed is:

1. An information processing apparatus that displays a numeric value input area having a plurality of digit positions, the information processing apparatus comprising:
a determination unit configured to determine, based on a movement of a numeral in one of the plurality of digit positions of the numeric value input area being instructed by the operation of the user, a movement direction of the movement of the numeral and a movement amount of the movement of the numeral;
a movement unit configured to move the numeral and other numerals in the plurality of digit positions to other digit positions of the plurality of digit positions in accordance with the movement direction and the movement amount determined by the determination unit; and
an insertion unit configured to insert a predetermined numeral into a digit position whose numeral has been moved and became undefined due to the moving by the numerals,
wherein the movement unit moves the numeral and the other numerals in all digit positions that exist in the movement direction from the digit position instructed by the operation of the user to other digit positions of the plurality of digit positions in accordance with the movement direction and the movement amount determined by the determination unit.

2. The information processing apparatus according to claim 1, wherein the numeric value input area is displayed on a touch panel and wherein the operation of the user is a move operation that instructs a movement in a leftward direction or a rightward direction on the touch panel.

3. The information processing apparatus according to claim 1, further comprising a discard unit configured to discard a numeral a numeral that has been moved outside of the plurality of digit positions in accordance with the movement direction and the movement amount determined by the determination unit.

4. The information processing apparatus according to claim 1, further comprising:
a storage unit configured to store setting information for restricting the movement of numeral in the numeric value input area upon the operation of the user, wherein the movement unit restricts the movement of numerals in the storage unit stores the setting information.

5. The information processing apparatus according to claim 1, further comprising a changing unit configured to change a numeric value in the numeric value input area to a maximum value or a minimum value, when, due to the movement of numerals, a numeric value in the numeric value input area becomes larger than the maximum value or smaller than the minimum value, if the maximum value and the minimum value for a numeric value to be input in the numeric value input area are set.

6. The information processing apparatus according to claim 1, further comprising a display control unit configured to display supplementary information for assisting with the recognition of the numeric value in the numeric value input area, and configured to change the supplementary information in accordance with the movement of the numerals in the plurality of digit positions.

7. The information processing apparatus according to claim 6, wherein the supplementary information is a unit of a numeric value of the numeric value input area or is a symbol for delimiting numerals in the numeric value input area.

8. The information processing apparatus according to claim 6, wherein the display control unit is configured to display the supplementary information below the numeric value input area.

9. The information processing apparatus according to claim 1, further comprising an increasing and decreasing unit configured to increase or decrease, in accordance with an operation by the user instructing a movement in an upward direction or in a downward direction on a digit position of the numeric value input area, a numeral of the digit position.

10. A method for controlling an information processing apparatus that displays a numeric value input area having a plurality of digit positions, the method comprising:
determining, based on a movement of at least one of the plurality of digit positions of the numeric value input area being instructed by an operation of the user, a movement direction of the movement of the numeral and a movement amount of the movement of the numeral;

moving the numeral and other numerals in the plurality of digit positions to other digit positions of the plurality of digits positions, in accordance with the movement direction and the movement amount determined in the determining; and inserting a predetermined numeral into a digit position whose numeral has been moved and become undefined by the movement of the numerals, wherein the numeral and the other numerals in all digit positions that exist in the movement direction from the digit position instructed by the operation of the user are moved to other digit positions of the plurality of digit positions in accordance with the determined movement direction and the determined movement amount.

11. A non-transitory computer-readable storage medium storing a program for causing a computer to function as an information processing apparatus that displays a numeric value input area having a plurality of digit positions, the information processing apparatus comprising:

a determination unit configured to determine, based on a movement of a numeral in one of the plurality of digit positions of the numeric value input area being instructed by an operation of a user, a movement direction of the movement of the numeral and a movement amount of the movement of the numeral;

a movement unit configured to move the numeral and other numerals in the plurality of digit positions to other digit positions of the plurality of digit positions in accordance with the movement direction and the movement amount determined by the determination unit; and an insertion unit configured to insert a predetermined numeral into a digit position whose numeral had been moved and become undefined due to the movement of the numerals, wherein the movement unit moves the numeral and the other numerals in all digit positions that exist in the movement direction from the digit position instructed by the operation of the user to other digit positions of the plurality of digit positions in accordance with the movement direction and the movement amount determined by the determination unit.

* * * * *